(12) United States Patent
Yang et al.

(10) Patent No.: US 7,792,177 B2
(45) Date of Patent: Sep. 7, 2010

(54) METHOD AND FURNACE FOR ELECTRICAL CALCINATION ENABLING UTILIZATION OF VOLATILE MATTERS

(75) Inventors: Kaixiang Yang, Shenyang (CN); Yi Sun, Shenyang (CN); Dongsheng Cui, Shenyang (CN)

(73) Assignee: China Aluminum International Engineering Corporation Limited, Beijing (CN)

( * ) Notice: Subject to any disclaimer, the term of this patent is extended or adjusted under 35 U.S.C. 154(b) by 899 days.

(21) Appl. No.: 11/512,720

(22) Filed: Aug. 30, 2006

(65) Prior Publication Data

US 2007/0064764 A1 Mar. 22, 2007

(30) Foreign Application Priority Data

Sep. 2, 2005 (CN) .................... 2005 1 0047126

(51) Int. Cl.
*F27D 7/06* (2006.01)
*H05B 3/00* (2006.01)

(52) U.S. Cl. ..................... 373/110; 373/109
(58) Field of Classification Search ............... 373/110, 373/113, 71, 83, 76, 3, 122, 118, 131, 137, 373/111, 115; 110/211
See application file for complete search history.

(56) References Cited

U.S. PATENT DOCUMENTS

| | | | | |
|---|---|---|---|---|
| 2,231,104 | A | * | 2/1941 | Berghaus et al. .............. 373/26 |
| 4,025,610 | A | * | 5/1977 | Suzuki et al. ................ 423/461 |
| 4,050,880 | A | | 9/1977 | Naito et al. |
| 4,496,313 | A | * | 1/1985 | Quittkat et al. ............... 432/14 |
| 4,635,273 | A | * | 1/1987 | Wilkening ................. 373/120 |
| 5,559,826 | A | * | 9/1996 | Ohtani et al. ............... 373/109 |
| 5,683,631 | A | | 11/1997 | Zabreznik |
| 6,157,667 | A | * | 12/2000 | Johansen et al. ............ 373/115 |

FOREIGN PATENT DOCUMENTS

| | | |
|---|---|---|
| CN | 101167 | 11/1988 |
| CN | 1240224 | 1/2000 |
| CN | 1252126 | 5/2000 |
| RU | 2244890 | 7/2003 |
| WO | 2005/033602 | 4/2005 |

OTHER PUBLICATIONS

Liu Rui, Elementary Introduction On Economic Energy Way Of Baking Furnace From Technical Reformation for 2# Baking Furnace Furnace, China Great Wall Aluminum Corporation Carbon Plant, Nov. 20, 2001, pp. 40-43.

* cited by examiner

*Primary Examiner*—Quang T Van
*Assistant Examiner*—Hung Nguyen
(74) *Attorney, Agent, or Firm*—Carlson, Gaskey & Olds

(57) ABSTRACT

A method and a furnace for electrical calcination enables utilization of volatile matters of petroleum coke or anthracite during electrical calcination, i.e. conventional calcination or semi-graphitization. The furnace includes an anode, a cathode, and a furnace body. The furnace body includes an annular inner wall, an annular fume duct disposed circumferentially outside of the annular inner wall, an annular outer wall for heat preservation disposed circumferentially outside of the annular fume duct, and an air passage disposed in the annular outer wall. The air passage is in communication with the fume duct and outer atmosphere, respectively. An outlet opening for the volatile matters, in communication with a hearth of the furnace body, is disposed in the fume duct. The combustible volatile matters of the petroleum coke, anthracite, or other raw material are sufficiently utilized during electrical calcination, therefore the energy is saved and the environmental pollution is reduced.

18 Claims, 2 Drawing Sheets

METHOD AND FURNACE FOR ELECTRICAL CALCINATION ENABLING UTILIZATION OF VOLATILE MATTERS

REFERENCE TO RELATED APPLICATION

This application claims priority to Chinese Patent Application No. 200510047126.5 filed on Sep. 2, 2005.

FIELD OF THE INVENTION

The invention relates to a method and apparatus for electrical calcination, in particular, the invention relates to a method and apparatus for electrical calcination enabling utilization of volatile matters in raw petroleum coke or anthracite during electrical calcination, i.e. conventional calcination or semigraphitization.

BACKGROUND OF THE INVENTION

During the manufacture of carbon products, in order to improve the qualities of cathode carbon blocks used in the field of electrolysis of aluminum and carburetant used in the field of metallurgy, the conventional electrical calcination process for anthracite or petroleum coke is performed by a resistance-type electrical calcination furnace. Such an electrical calcination furnace will discharge 6-12% or more of volatile matters in furnace charge during heating, and the discharged volatile matters are directed through a heat-resistant duct into air to combust or discharge, which leads to energy waste and environmental pollution. In the configuration of the electrical calcination furnace, a lower cathode is self-baked electrode paste. The electrode paste is softened due to being heated, and then the deformation or even the inclination thereof will occur owing to the gravitation of the furnace charge to be heated. As a result, the operation current of the electrical calcination furnace is often biased. In addition, the wall of such an electrical calcination furnace is thin, therefore the power energy loss is higher. A disk discharger is typically used in the electrical calcination furnace to discharge materials. Because the temperature of the furnace charge is above 1600° C. and it is difficult to cool the furnace body with a big diameter, a large amount of cooling water is consumed and the disk discharger is usually operated at 400° C. or even above 500° C. Consequently, the mechanical wear is increased and the operation life is short. Furthermore, because of the structural complexity of the disk discharger, it is hard to maintain the disk discharger or replace its parts.

An anode of the conventional electrical calcination furnace is formed by filling electrode paste into a steel cylinder. Such anode has disadvantages of large resistance and low conductivity. Additionally, the steel cylinder is melted at high temperature, which will increase the iron content in the material to be calcined so as to damage its use in subsequent procedure. The electrode paste in the steel cylinder comprises 20% or more of pitch, and some volatile matters are emitted from the pitch when an end of the anode adjacent to the furnace is heated. The volatile matters emitted from the pitch will pollute environments. In order to complement the electrode that has been consumed, it is necessary to weld a new steel cylinder to the original steel cylinder. Accordingly, the anode is troublesome in use and has disadvantages of environmental pollution and deteriorating the product quality. Besides, an anode clamping device for the conventional electrical calcination furnace is disposed in an annular space within a small hopper, therefore, it is inconvenience to examine, repair, and replace the anode. To sum up, it is significant to develop a novel electrical calcination furnace and an electrical calcination method thereof.

SUMMARY OF THE INVENTION

The present invention provides a method and furnace for electrical calcination that enables utilization of volatile matters, which makes use of volatile matters of raw petroleum coke or anthracite during electrical calcination, thereby saving energy and reducing environmental pollution.

According to an aspect of the invention, an electrical calcination furnace enabling utilization of volatile matters includes an anode, a cathode and a furnace body having a furnace wall that defines a hearth. A fume duct is disposed in the furnace wall, and the fume duct is in communication with the hearth for receiving and directing the volatile matters from the hearth. An air passage is disposed in the furnace wall, and the air passage is in communication with the fume duct and outer atmosphere for directing air into the fume duct.

Preferably, the furnace wall of the furnace body includes an inner wall and an outer wall, and the fume duct is formed between the inner wall and the outer wall. The air passage is formed in the outer wall. The fume duct includes a plurality of annular passages arranged along the furnace body, and each annular passage surrounds the hearth. The hearth is in communication with the fume duct via at least one outlet opening for volatile matters. The at least one outlet opening is located at the upmost annular passage of the fume duct. The fume duct terminates in a fume outlet opening at the lower portion of the furnace body, and the fume outlet opening is connected to a suction device.

Preferably, the inner wall is thermal conductive, and the outer wall is thermal insulative.

Preferably, a small hopper separated from a clamping device is disposed at a feeding opening at an upper end of the furnace body, and a big hopper is disposed above the small hopper.

Preferably, a water-cooling steel support is disposed below the cathode, and a steel skeleton is disposed below the water-cooling steel support and the furnace body. A water-cooling jacket is disposed at a discharge opening of the furnace body. The water-cooling jacket is connected to the steel skeleton at an upper end of the water-cooling jacket. The cathode is fixed onto the water-cooling steel support.

Preferably, the anode and cathode are made of graphitized or calcined materials.

According to another aspect of the invention, a method for electrical calcination enabling utilization of volatile matters includes the steps of feeding raw petroleum coke or anthracite through the feeding opening into the hearth of the furnace body and applying an electrical current through the raw petroleum coke or anthracite in the hearth, which generates resistance heat that heats the raw petroleum coke or anthracite. The method further includes the steps of releasing volatile matters out from the petroleum coke or anthracite along with an increase of temperature and directing the volatile matters from the hearth via the outlet opening into the fume duct under the action of a negative pressure generated by a suction device. The method further includes the steps of directing air through the air passage into the fume duct, mixing the volatile matters and the air within the fume duct and combusting the mixture, wherein a high temperature fume is generated during combustion, and directing the high temperature fume to run in the fume duct, wherein the heat of the fume is transferred to the petroleum coke or anthracite to be calcined through the furnace wall of the furnace body. The method further includes the step of heating the petroleum coke or anthracite by the resistance heat in combination with the heat from the fume so as to produce a calcined product.

Preferably, in above method, the calcined product is discharged from a discharge opening by means of its gravitation.

The advantages of the invention are described below. According to the above-mentioned structure and method, the combustible volatile matters of the petroleum coke, anthracite or other raw materials are utilized during electrical calcination. Therefore, the electrical heat energy is saved, and the environmental pollution is reduced. The anode and cathode are made of graphitized or calcined materials, which solved some problems, such as the environmental pollution caused by the anode and the troublesomeness to replace the anode and the bias current caused by the cathode deformation. The electrical energy is saved so as not to dissipate through the wall as much as possible. The way to arrange the furnace body over the steel skeleton is flexible and investment-reduced. A disk discharger is eliminated by means of utilizing the gravitation of furnace charge itself. Consequently, the problems of short duration and frequent maintenance of the discharger are solved. With the inner wall and outer wall for heat preservation, i.e. double-walls structure, the loss of the electrical heat energy caused by outward conduction is reduced. For instance, the furnace temperature will be raised about 200° C. when the fire resistance of the inner wall is improved. The electrical calcination furnace according to the present invention can save 20-30% of electrical energy. The electrical calcination furnace and method according to the present invention are also applicable to other calcination of the furnace charge including combustible volatile matters.

DETAILED DESCRIPTION OF THE PREFERRED EMBODIMENT

Figure 1:
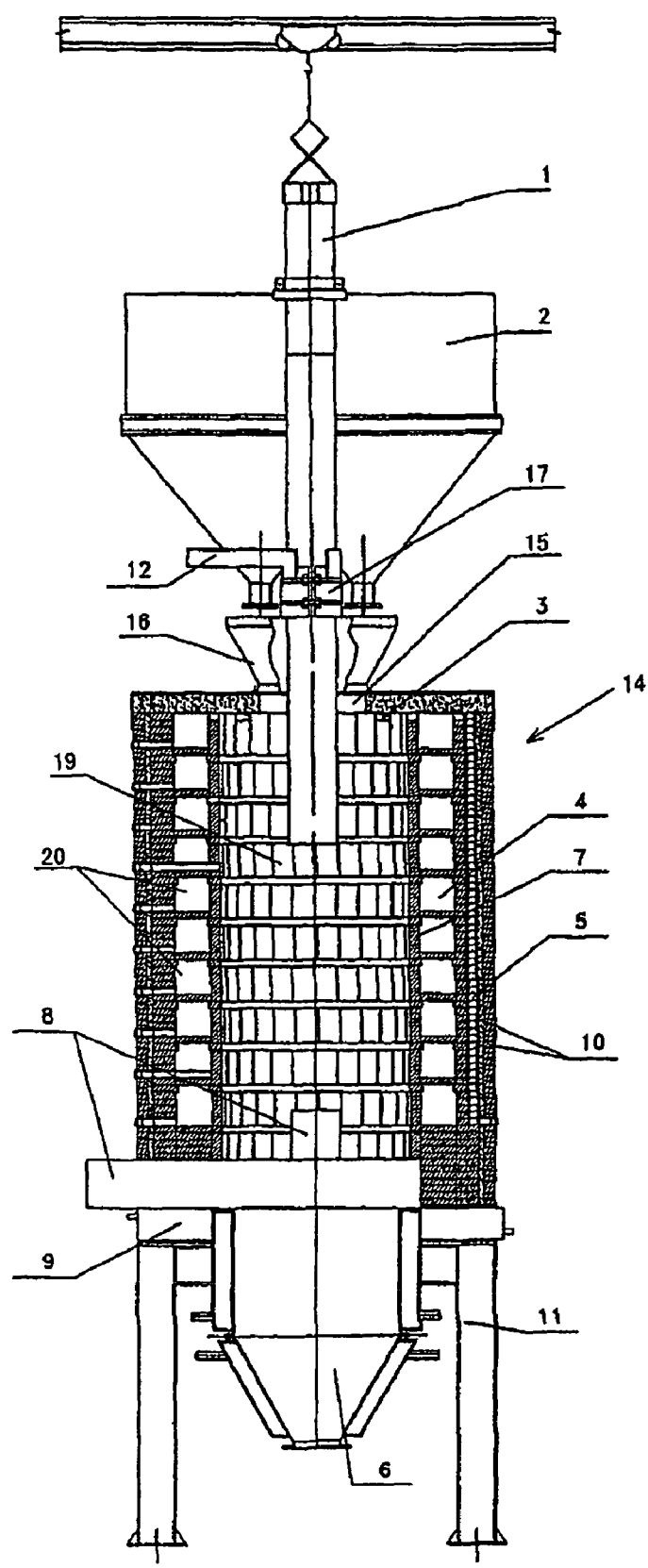
FIG. 1 is a front view of the electrical calcination furnace of the invention.
Figure 2:
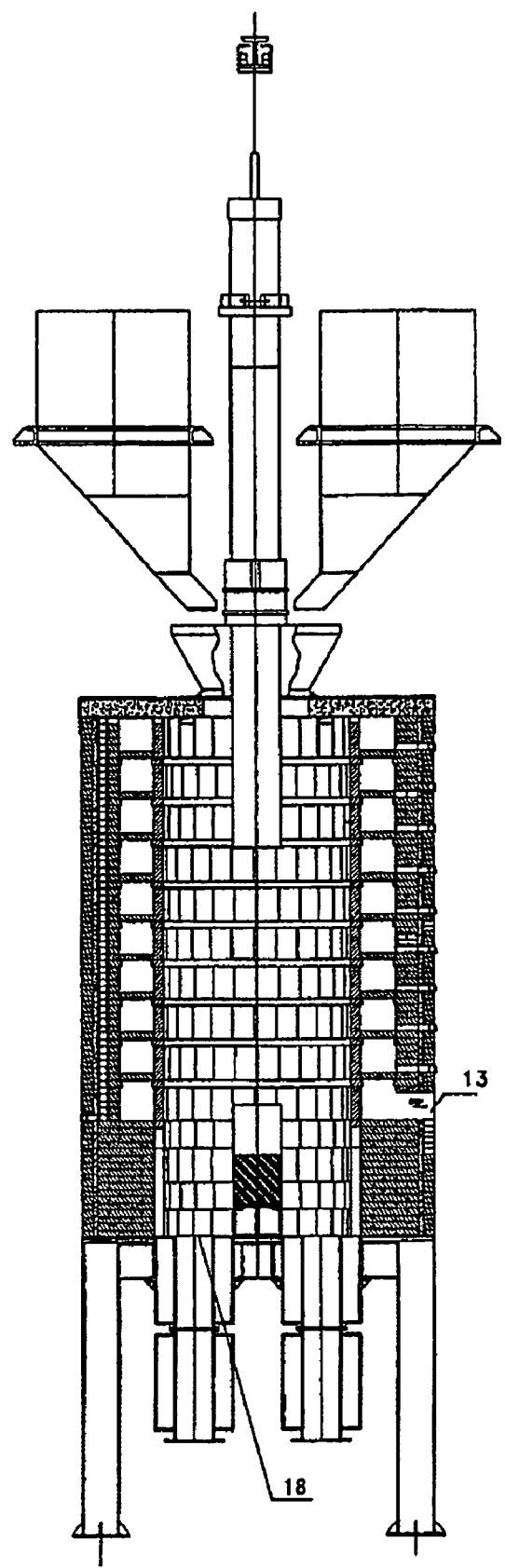
FIG. 2 is a side view of the electrical calcination furnace of present invention.

Referring to FIGS. 1 and 2, the electrical calcination furnace enabling utilizing volatile matters includes an anode 1, a cathode 8 and a furnace body 14. The furnace body 14 has a furnace wall that defines a hearth 19. Usually, the furnace wall and thus the hearth 19 are a cylindrical shape. Each of the anode 1 and the cathode 8 has a portion disposed into the hearth 19 of the furnace body 14.

A fume duct 4 is disposed in the furnace wall. In an embodiment, the furnace wall of the furnace body 14 includes an inner wall 7 and an outer wall 10, and the fume duct 4 is formed between the inner wall 7 and the outer wall 10. In an embodiment, the inner wall 7 is thermal conductive, and the outer wall 10 is thermal insulative. In an embodiment, the fume duct 4 includes a plurality of annular passages 20 arranged along the furnace body 14, and each annular passage 20 surrounds the hearth 19 and usually has a square cross-section. Adjacent annular passages 20 are in communication with each other, therefore the fume duct 4 generally forms an approximately spiral duct that surrounds the hearth 19. The fume duct 4 is in communication with the hearth 19 via at least one outlet opening 3 for volatile matters in order to receive and direct the volatile matters from the hearth 19. In an embodiment, there are a plurality of outlet openings 3 located at the upmost annular passage of the fume duct 4 and spaced from each other. The fume duct 4 terminates in a fume outlet opening 13 at the lower portion of the furnace body 14, and the fume outlet opening 13 is connected to a suction device (not shown) such as an external chimney and a suction fan.

An air passage 5 is disposed in the furnace wall. In an embodiment, the air passage 5 is formed in the outer wall 10. The air passage 5 is in communication with the fume duct 4 and the outer atmosphere. In an embodiment, the air passage 5 extends vertically in the outer wall 10. The air passage 5 is in communication with the outer atmosphere at a lower end of the air passage 5 and is in communication with the fume duct 4 at an upper end of the air passage 5. Thus, the air passage 5 directs air from bottom to top then into the fume duct 4.

In an embodiment, a small hopper 16 is disposed at a feeding opening 15 at an upper end of the furnace body 14, and one or two big hoppers 2 are disposed above the small hopper 16.

In an embodiment, a water-cooling steel support 9 is disposed below the cathode 8, and a steel skeleton 11 is disposed below the water-cooling steel support 9 and the furnace body 14. A water-cooling jacket 6 is disposed at a discharge opening 18 of the furnace body 14. The water-cooling jacket 6 is connected to the steel skeleton 11 at an upper end of the water-cooling jacket 6. The cathode 8 is fixed onto the water-cooling steel support 9. A conductive busbar 12 has a clamping device 17. One end of the busbar 12 is connected to an external AC/DC power supply system (not shown), and the other end of the busbar 12 is fixed onto the anode 1 by the clamping device 17 that is separated from the small hopper 16. Similarly, an electrical conductive busbar connected to an external AC/DC power supply system is also provided to the cathode 8.

In an embodiment, the anode 1 and the cathode 8 are made of graphitized or calcined materials.

The method for electrical calcination enabling utilization of volatile matters is described in the following text, which can be implemented by means of, for example, the electrical calcination furnace of the invention as described above.

The method for electrical calcination can utilize the volatile matters in materials during the electrical calcination process. In the method, raw petroleum coke or anthracite in the big hopper 2 passes through the small hopper 16 and the feeding opening 15 into the cylindrical hearth 19. One end of the electrical conductive busbar 12 with the clamping device 17 is connected to the external AC/DC power supply system, and the other end of the electrical conductive busbar 12 is fixed onto the anode 1 by the clamping device 17. When energized, the current is applied to the raw petroleum coke or anthracite etc. (referred as resistance materials) at the center of the hearth by the busbar 12 and the anode 1. At the initial operation stage, a large amount of resistance heat is generated when the current flows through the raw petroleum coke or anthracite at the center of the hearth 19. It is noted that, at the initial stage, it is possibly necessary to mix a little of semi-graphitized coke or anthracite to the raw petroleum coke or anthracite. At the same time, the raw petroleum coke or anthracite is heated by resistance heat and they will transfer/diffuse heat outwards. With the increase of temperature, the raw petroleum coke or anthracite releases considerable volatile matters. Under the action of a negative pressure generated by the external chimney or draught fan, the volatile matters is directed from the outlet opening 3 into the fume duct 4 and mixed with air from the air passage 5. Then, the mixture is fully combusted to produce a high temperature fume above 1000° C. running in the fume duct 4. The heat of the fume is transferred to the furnace charge (i.e. the petroleum coke or anthracite) to be calcined through the inner wall 7 of the furnace body 14. The petroleum coke or anthracite is heated by the resistance heat in combination with the heat from the fume so as to produce a qualified calcined product. Then, the calcined product is discharged, by means of its gravitation, through the discharge opening 18 and the water-cooling jacket 6 to the outside of the furnace at a lower temperature.

The big hopper 2 is filled with the furnace charge at all time. Therefore, when discharging from the discharge opening 18, the furnace charge in the bigger hopper 2 will be constantly fed into the small hopper 16 by its gravitation. As a result, the small hopper 16 and hearth 19 always are full of furnace charge.

The arrangement of the inner wall 7 and the heat preservation outer wall 10 can reduce the loss of the electrical heat energy caused by its outward transfer, which has a heat insulative effect. For instance, the furnace temperature will be increased about 200° C. if the fire resistance of the inner wall 7 is improved.

Because of oxidation at high temperature, the anode made of graphitized or calcined materials will be constantly consumed. In order to complement the anode 1, the clamping device 17 for the busbar 12 is released, and a new anode is lifted and then is connected to the original anode 1 by a screw way, and finally the busbar clamping device 17 is tightened. For the convenience to replace, examine and repair the anode 1, the busbar clamping device 17 is separated from an annular space of the small hopper 16 and disposed above the small hopper 16. During operation, the anode 1 according to the present invention will not pollute the environment.

The electrical calcination furnace according to the present invention is also applicable to calcine other furnace charges with combustible volatile matters.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

The invention claimed is:

1. An electrical calcination furnace enabling utilization of volatile matters comprising:
   an anode;
   a cathode;
   a furnace body having a furnace wall which defines a hearth for containing raw materials to be calcinated;
   a fume duct disposed in the furnace wall, the fume duct being in communication with the hearth for receiving and directing volatile matters from the hearth; and
   an air passage disposed in the furnace wall, the air passage being in communication with the fume duct and outer atmosphere for directing air into the fume duct,
   wherein in operation a resistance heat is generated by applying an electrical current through the raw materials by the anode and the cathode, and a combustion heat is generated by combusting a mixture of the volatile matters, and the air is directed along the fume duct,
   wherein the anode, the cathode and the fume duct are positioned so that the raw materials located in at least a part of the hearth is heated by the resistance heat and the combustion heat simultaneously, and
   wherein the fume duct includes a plurality of annular passages spaced apart from one another in a direction along the furnace body, and each of the plurality of annular passages surrounds the hearth.

2. The electrical calcination furnace of claim 1, wherein the furnace wall of the furnace body comprises an inner wall and an outer wall, and the fume duct is formed between the inner wall and the outer wall.

3. The electrical calcination furnace of claim 2, wherein the air passage is formed in the outer wall.

4. The electrical calcination furnace of claim 1, wherein the hearth is in communication with the fume duct via at least one outlet opening for the volatile matters.

5. The electrical calcination furnace of claim 4, wherein the at least one outlet opening is located at an upmost annular passage of the fume duct.

6. The electrical calcination furnace of claim 3, wherein the fume duct terminates in a fume outlet opening at a lower portion of the furnace body, and the fume outlet opening is connected to a suction device.

7. The electrical calcination furnace of claim 2, wherein the inner wall is thermal conductive and the outer wall is thermal insulative.

8. The electrical calcination furnace of claim 1, wherein a small hopper separated from a clamping device is disposed at a feeding opening at an upper end of the furnace body, and a big hopper is disposed above the small hopper.

9. The electrical calcination furnace of claim 1, wherein a water-cooling steel support is disposed below the cathode, and a steel skeleton is disposed below the water-cooling steel support and the furnace body.

10. The electrical calcination furnace of claim 1, wherein a water-cooling jacket is disposed at a discharge opening of the furnace body.

11. The electrical calcination furnace of claim 10, wherein the water-cooling jacket is connected to a steel skeleton at an upper end of the water-cooling jacket.

12. The electrical calcination furnace of claim 1, wherein the cathode is fixed onto a water-cooling steel support.

13. The electrical calcination furnace of claim 1, wherein the anode and the cathode are made of graphitized or calcined materials.

14. A method for electrical calcination enabling utilization of volatile matters, the method comprising steps:
   feeding raw petroleum coke or anthracite through a feeding opening into a hearth of a furnace body;
   applying an electrical current through the raw petroleum coke or the anthracite in the hearth which generates resistance heat that heats the raw petroleum coke or the anthracite;
   releasing the volatile matters out from the petroleum coke or the anthracite along with an increase of temperature;
   directing the volatile matters from the hearth via an outlet opening into a fume duct under the action of a negative pressure generated by a suction device;
   directing air through an air passage into the fume duct;
   mixing the volatile matters and the air within the fume duct and combusting the mixture, wherein a high temperature fume is generated during combustion;
   directing the high temperature fume to run in the fume duct, wherein the heat of the fume is transferred to the petroleum coke or the anthracite to be calcined through a furnace wall of the furnace body; and
   simultaneously heating the petroleum coke or the anthracite by the resistance heat in combination with the heat from the fume so as to produce a calcined product, wherein the fume duct includes a plurality of annular passages spaced apart from one another in a direction along the furnace body, and each of the plurality of annular passages surrounds the hearth.

15. The method of claim 14, wherein the calcined product is discharged from a discharge opening by gravity.

16. The electrical calcination furnace of claim 4, wherein a pair of adjacent annular passages of the fume duct are in communication with each other, and the fume duct forms an approximately spiral duct that surrounds the hearth.

17. The electrical calcination furnace of claim 1, wherein at least a portion of the air passage extends longitudinally along the furnace wall and is spaced apart from the fume duct, thereby receiving a portion of the combustion heat from the fume duct for preheating the air in the air passage.

18. The electrical calcination furnace of claim 17, wherein the air passage extends vertically in the furnace wall and directs the air from a bottom to the top of the furnace body then into the fume duct.

\* \* \* \* \*